United States Patent [19]
Lee et al.

[11] Patent Number: 5,956,529
[45] Date of Patent: Sep. 21, 1999

[54] HAND TREMOR COMPENSATING APPARATUS USING MAGNETS

[75] Inventors: Sung-hee Lee, Suwon; Jae-ho Moon, Seoul; Jeong-kwan Lee, Kyungki-do, all of Rep. of Korea

[73] Assignee: Samsung Electronics Co., LTD., Kyungki-Do, Rep. of Korea

[21] Appl. No.: 09/110,869

[22] Filed: Jul. 7, 1998

[30] Foreign Application Priority Data

Oct. 10, 1997 [KR] Rep. of Korea ...................... 97-28185

[51] Int. Cl.⁶ .................................................. G03B 17/24

[52] U.S. Cl. ........................... 396/55; 348/203; 348/208; 359/555

[58] Field of Search ....................... 396/52, 55; 348/203, 348/204, 205, 208; 359/554–557

[56] References Cited

U.S. PATENT DOCUMENTS 5,689,369  11/1997  Noguchi .................................. 359/557
5,729,521   3/1998  Otsuka .................................... 369/112

Primary Examiner—David M. Gray
Attorney, Agent, or Firm—Sughrue, Mion, Zinn, Macpeak & Seas, PLLC

[57] ABSTRACT

A hand tremor compensating apparatus for a video camera has a bobbin for supporting and protecting a mirror section. The bobbin has a contact portion with a groove provided therein. A barrel is disposed at an outside of the bobbin. The barrel has a boss in which a post is inserted. The bobbin is slidably mounted on the boss. A rotation restraining section employs a magnetic force to restrain the movement of the bobbin. The magnetic force is an attractive force generated between magnets respectively fixed to the bobbin and the post.

5 Claims, 5 Drawing Sheets

HAND TREMOR COMPENSATING APPARATUS USING MAGNETS

BACKGROUND OF THE INVENTION

1. Field of the Invention

The present invention relates in general to a hand tremor compensating apparatus for a video camera using magnets, and more particularly to a hand tremor compensating apparatus for a video camera, wherein a mirror section of the hand tremor compensating apparatus is secured by a magnetic force, so that the mirror section is restrained from rotating in the circumferential direction thereof when a bobbin is driven, thereby effectively compensating the hand tremor phenomenon.

2. Description of the Related Art

A video camera shoots, records and reproduces a picture. The video camera is manufactured in a small size to permit the user to easily carry the video camera.

Since the user manually takes a picture, a hand tremor phenomenon occurs that causes reproduced images to be dispersed. The hand tremor phenomenon can be reduced by various camera techniques. However, the phenomenon still scatters the focus of the reproduced images. In particular, when the reproduced image is magnified and projected onto a large screen, a distinct picture cannot be obtained due to the hand tremor phenomenon.

In order to solve the above problem, a hand tremor compensating apparatus as shown in FIGS. 1 and 2 has been suggested. Conventional video cameras, therefore, comprise a camera section and a hand tremor compensating apparatus.

The camera section includes a case 2 having a window 1 at a front end thereof, a lens holder 3 installed in the case 2, a barrel master 4 coupled to a rear portion of the lens holder 3, and a solid-state image pickup device fixedly coupled to a rear wall of the barrel master 4 for recording image information based on an incident beam from an object.

A lens group including a focus lens 7 for focusing the incident beam and a zoom lens 6 for enlarging or reducing the magnification of the incident beam is mounted in the lens holder 3 and the barrel master 4. Coupled between the lens holder 3 and the barrel master 4 is an iris for adjusting an amount of the incident beam.

A charge coupled device (hereinafter referred to as a CCD) 5 transforms the incident beam into electric information, thereby generating image information.

As shown in FIG. 2, the hand tremor compensating apparatus includes a mirror section 8 disposed between the object and the lens group, a bobbin 9 having a hemisphere-shaped contact portion 9a for protecting and supporting the mirror section 8, a barrel 10 disposed about an outside of the bobbin 9, and a hand tremor compensating member.

The contact portion 9a protrudes from the center of an underside of the bobbin 9, and is provided at its outer circumference with a spring rack 9b.

A boss 11 extends along a center of the barrel 10. The boss 11 has a hollow portion 11a into which a post 12 is screw-coupled. One end of a spring 13 is connected to the post 12, and the other end of the spring 13 is connected to the spring rack 9b. Accordingly, the spring 13 influences the center point of the bobbin 9 to align with the boss 11 when the bobbin 9 is moved in the rolling and pitch directions. The tension of the spring 13 is adjustable by adjusting the insertion position of the post 12 within the hollow portion 11a of the boss 11.

A light emitting diode 14 is fixed to one side of the bobbin 9. A light receiving diode 15 is fixed to an upper side of the barrel 10 in line with the light emitting diode 14. The light emitting diode 14 and light receiving diode 15 recognize a number of rotation times and an angle of the mirror section 8 when compensating for the hand tremor.

The hand tremor compensating member includes a rolling actuator and a pitch actuator 16 which provide a driving force for driving the bobbin 9 in the rolling and pitch directions. The pitch actuator 16 has the same construction as the rolling actuator and is disposed perpendicular to the rolling actuator. Only the pitch actuator 16 is shown in the figures.

The pitch actuator 16 includes a support 17 fixed to a lower portion of the bobbin 9, a coil 18 wound around one end of the support 17, a magnet 19 which interacts with a magnetic field generated by the coil 18, and a voice coil motor having a U-shaped yoke 20. Magnet 19 is attached to an inner side wall of the U-shaped yoke 20.

In the structure mentioned above, the incident beam from the object passes through the window 1 and is reflected by the mirror section 8. The incident beam, reflected at a right angle, is introduced into the CCD 5 through the lens group such as a zoom lens 6 and a focus lens 7.

At this time, an angular velocity sensor detects the hand tremor, if any occurs, and sends a signal to the rolling and pitch actuators 16.

The rolling and pitch actuators 16 operate upon receiving the signals from the sensor. That is, when an electric current is applied to the coil 18, the support 17 moves up and down as a result of the magnetic interaction between the coil 18 and the magnet 19.

Accordingly, the bobbin 9 including the mirror section 8 is finely driven in the rolling and pitch directions due to the up and down movement of support 17.

At this time, light emitting diode 14 and light receiving diode 15 recognize a number of rotation times and an angle of the mirror section 8 and control the mirror section 8 in the rolling and pitch directions, thereby compensating for the hand tremor.

In addition, when the bobbin 9 is driven, the influence of the spring 13 prevents the bobbin 9 from moving away from the boss 11, such that the contact between the contact portion 9a and the upper surface of the boss 11 is maintained. Accordingly, the gap between the bobbin 9 and the boss 11 is fixed. Further, the spring 13 prevents the bobbin 9 from rotating in the circumferential direction.

Since the gap and the center point of the bobbin with respect to the boss are constantly maintained by the spring 13, it is difficult to precisely adjust the insertion position of the post 12 for adjusting the tension and the length of the spring 13. In addition, assembling the spring into the hand tremor apparatus is difficult.

Further, if the elasticity of the spring 13 changes, the gap between the bobbin 13 and the boss 11 cannot be constantly maintained. For this reason, the alignment of the center point of the bobbin 9 with respect to the boss cannot be maintained.

In addition, since a tremor occurs in the spring when compensating for the hand tremor by driving the rolling and pitch actuators, the hand tremor compensating is not sufficiently carried out.

SUMMARY OF THE INVENTION

The present invention overcomes the above described shortcomings associated with the prior art. Accordingly, it is an object of the present invention to provide a hand tremor compensating apparatus for a video camera in which magnets are respectively fixed to a bobbin and a post such that an attractive force is generated therebetween, thereby constantly maintaining the gap formed between the bobbin and the boss. Moreover, the attractive force maintains an alignment between a center point of the bobbin and the boss.

Another object of the present invention is to provide a hand tremor compensating apparatus for a video camera in which the bobbin is easily driven so that the hand tremor compensating efficiency is improved.

The present hand tremor compensating apparatus is provided for a video camera having a case with a window at a front end thereof, a camera section installed in the case, a mirror section installed between the window and the camera section for reflecting an incident beam from an object, and rolling and pitch actuators for driving the mirror section in the rolling and pitch directions. The present hand tremor compensating apparatus comprises a bobbin supporting and protecting the mirror section. The bobbin has a contact portion provided with a groove therein. A barrel is disposed at an outside of the bobbin and inclined by a predetermined angle. The barrel has a boss protruded at an underside thereof, and into which a post is inserted. A rotation restraining section for restraining the bobbin from rotating in a circumferential direction by using a magnetic force is placed in the groove and the post.

The rotation restraining section includes a first magnet fixed in the groove and a second magnet fixed on an upper surface of the post. Instead of a magnet, the rotation restraining section may include a magnetic substance metal placed in at least one of the bobbin and the post.

The magnets are respectively fixed to the bobbin and the post such that an attractive force is generated therebetween. The attractive force maintains a fixed gap formed between the bobbin and the boss, and maintains an alignment between a center point of the bobbin and the boss. In addition, the bobbin is easily driven so that the hand tremor compensating efficiency is improved.

BRIEF DESCRIPTION OF THE DRAWINGS

The above object and other advantages of the present invention will become more apparent by describing in detail a preferred embodiment thereof with reference to the attached drawings, in which.

DETAILED DESCRIPTION OF THE PREFERRED EMBODIMENT

Figure 1:
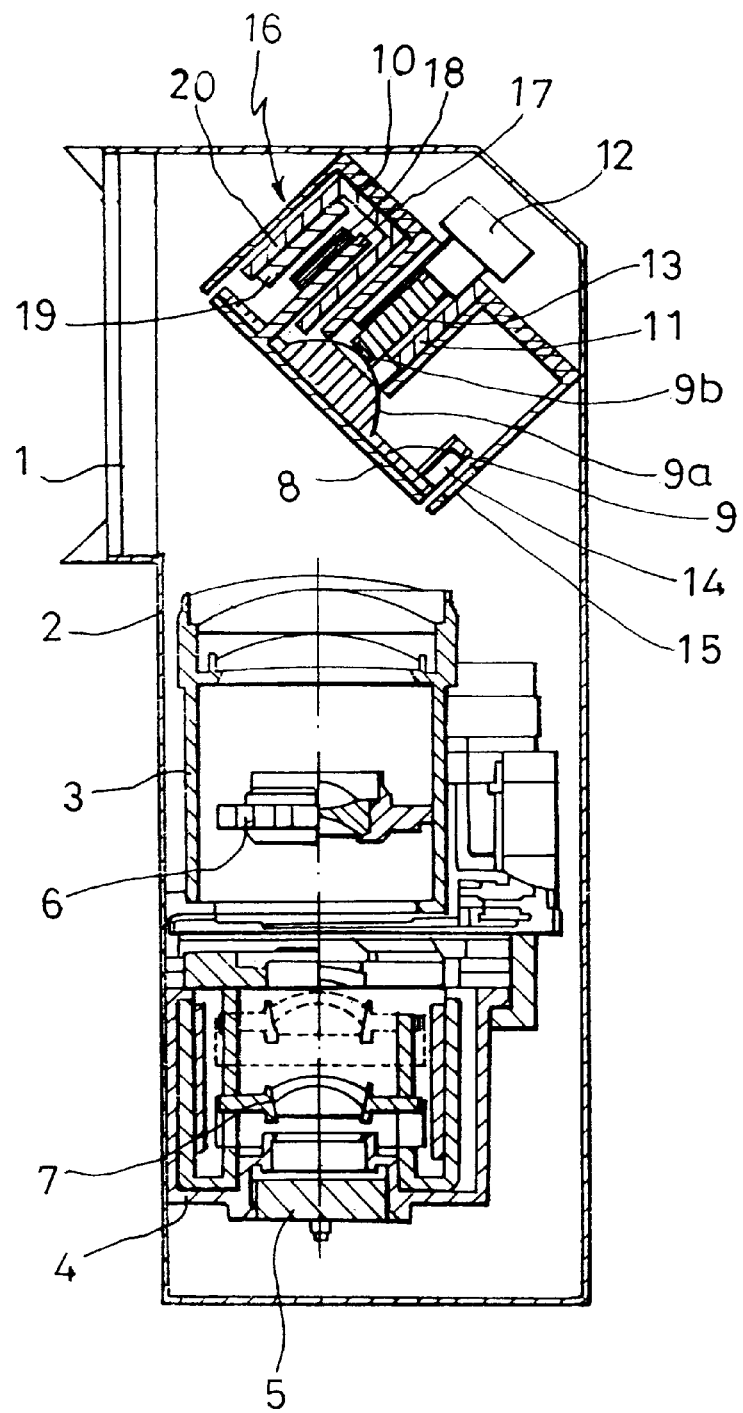
FIG. 1 is a side sectional view of a video camera having a conventional hand tremor compensating apparatus.
Figure 2:
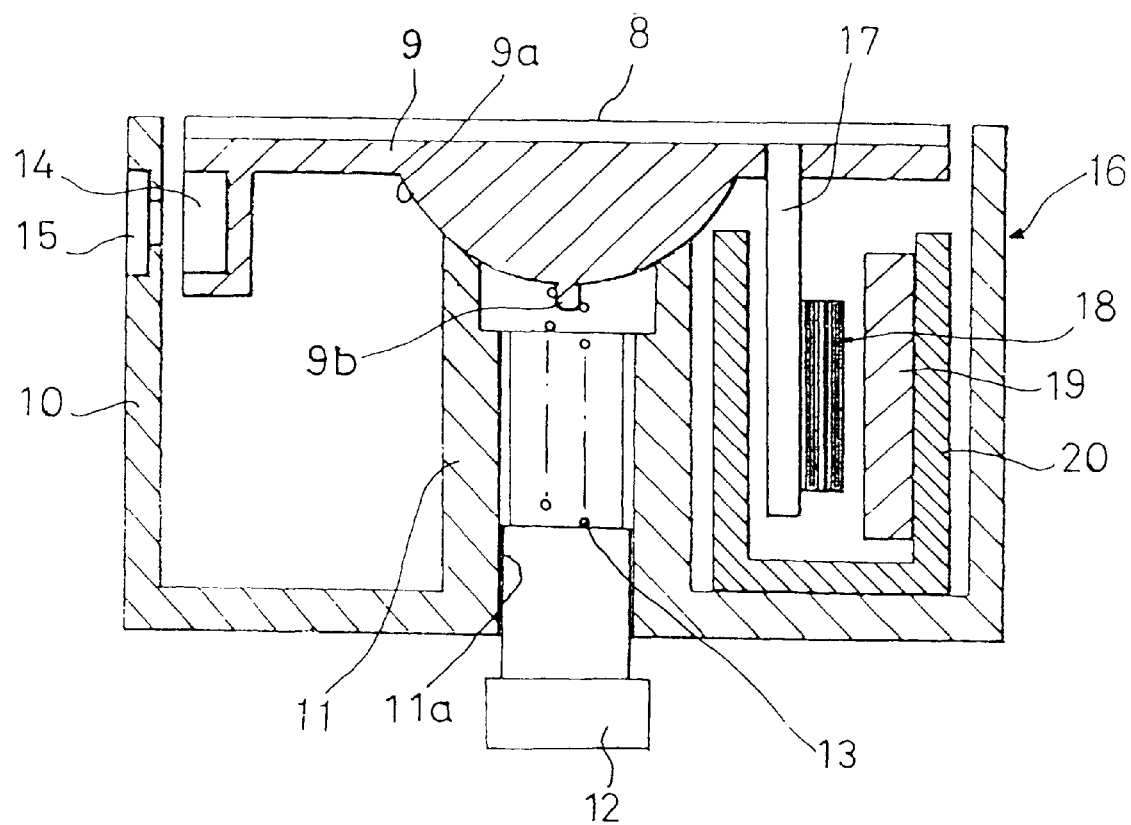
FIG. 2 is a sectional view of the hand tremor compensating apparatus shown in FIG. 1.
Figure 3:
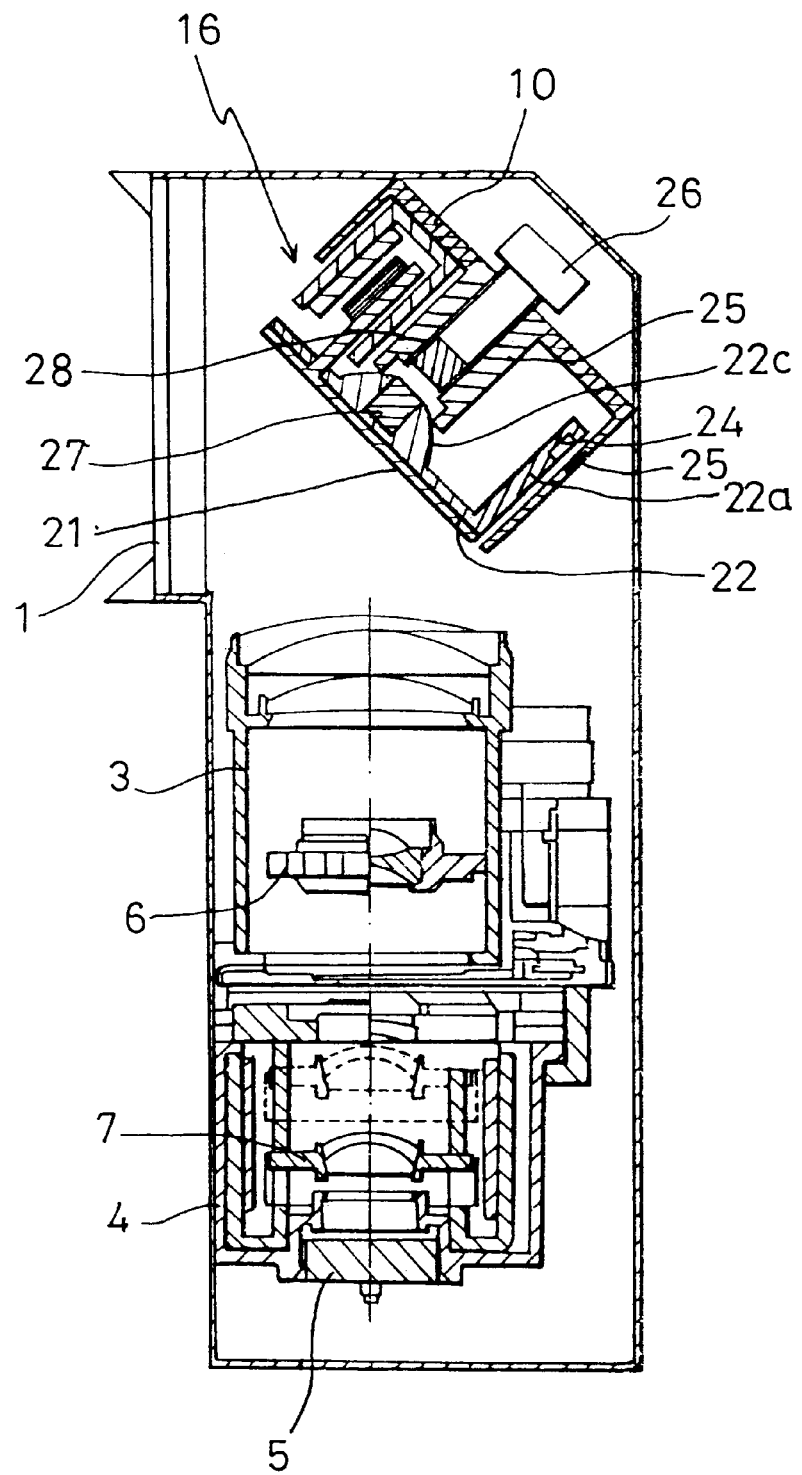
FIG. 3 is a side sectional view of a video camera having a hand tremor compensating apparatus using magnets according to the present invention.
Figure 4:
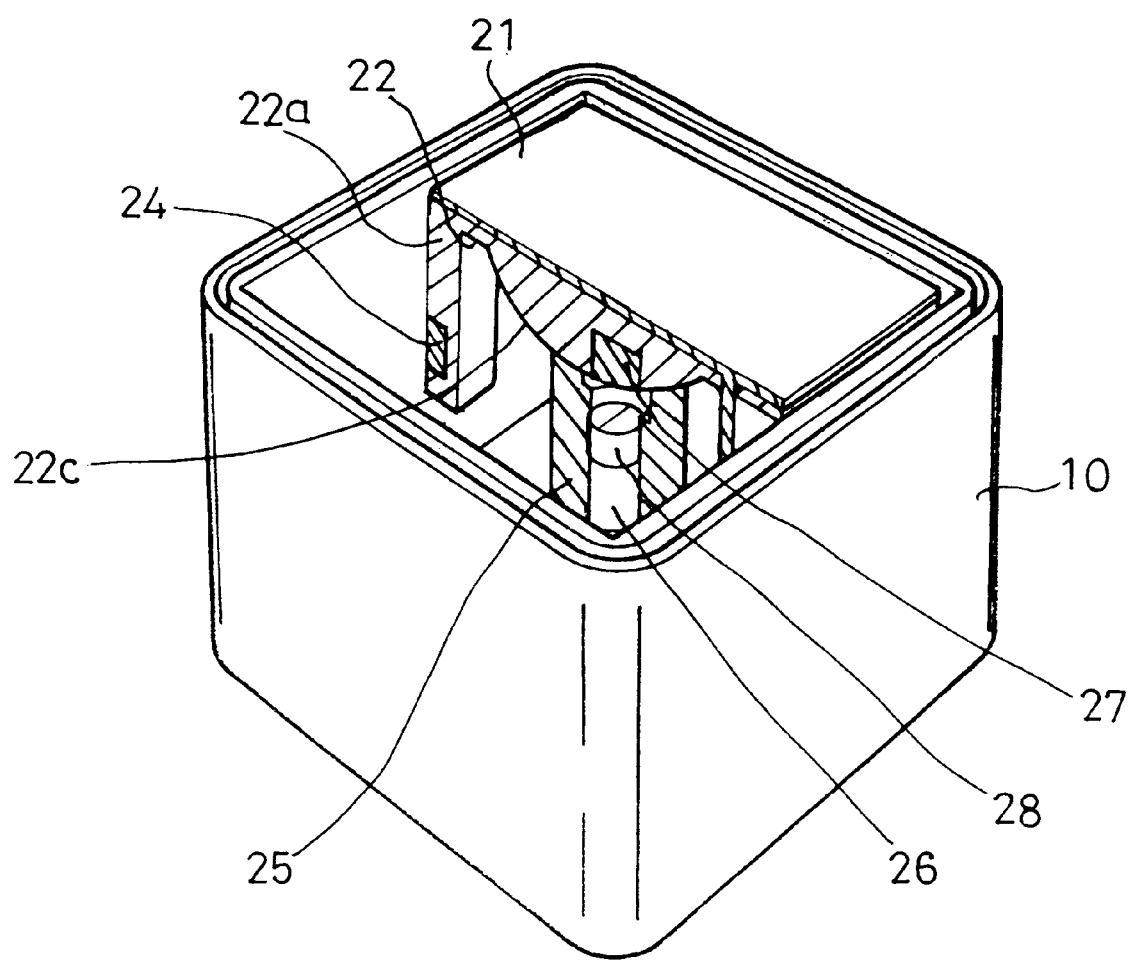
FIG. 4 is a perspective view of a video camera having a hand tremor compensating apparatus using magnets according to the present invention.
Figure 5:
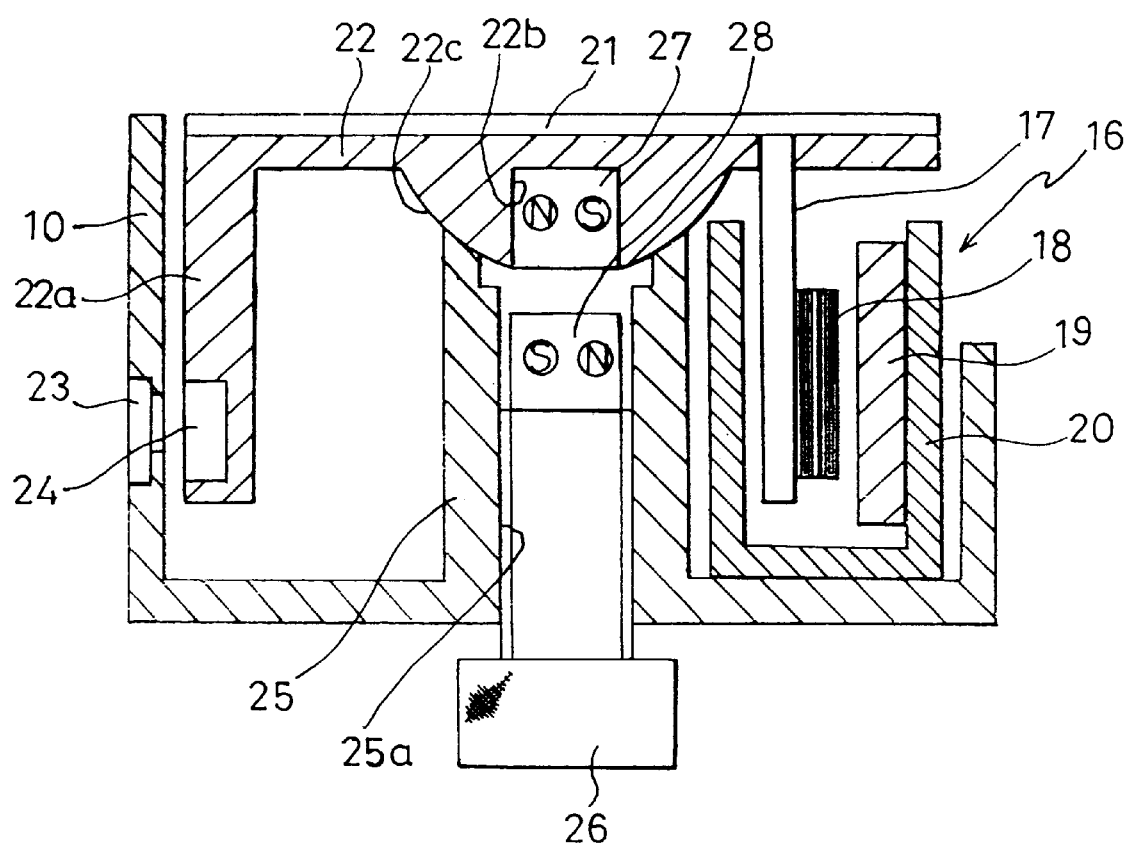
FIG. 5 is a sectional view of the hand tremor compensating apparatus shown in FIG. 4.

FIGS. 3 to 5 illustrate a hand tremor compensating apparatus using magnets according to the present invention. The hand tremor compensating apparatus comprises a mirror section 21 for reflecting incident light beams from an object, a bobbin 22 having a bending portion 22a for protecting and supporting the mirror section 21, rolling and pitch actuators 16 for driving the bobbin 22 in the rolling and pitch directions, and a rotation restraining member for restraining the bobbin 22, when driven by the rolling and pitch actuators 16, from rotating in the circumferential direction.

The mirror section 21 is installed between the object and a lens holder 3 such that it is inclined by a predetermined angle. The bobbin 22 is integrally provided at an underside of the mirror section 21. The bobbin 22 has a contact portion 22c with a groove 22b provided therein. A light emitting diode 23 cooperates with an opposed light receiving diode 24 to recognize a number of rotation times and an angle of the mirror section 21. The light emitting diode 23 is fixed to a lower side portion of a barrel 10, and the light receiving diode 24 is fixed to a lower portion of the bending portion 22a in alignment with the light emitting diode 23.

A boss 25 protrudes from an underside of the barrel 10. The boss 25 has a hollow portion 25a into which a post 26 is screw-coupled.

The rotation restraining member comprises a first magnet 27 fixed in the groove 22b, and a second magnet 28 fixed to the upper surface of the post 26. The first and second magnets 27, 28, respectively, are disposed to have an opposite polarity to each other such that an attractive force is generated therebetween.

Instead of a magnet, a magnetic substance metal may comprise the rotation restraining member; the magnetic substance metal being placed in at least one of the bobbin 22 and the post 26.

According to the hand tremor compensating apparatus of the present invention, the incident beam from the object passes through the window 1 and is reflected by the mirror section 21. The incident beam, reflected at a right angle, is introduced into a CCD 5. At this time, an angular velocity sensor detects the hand tremor, if any occurs, and sends a signal to the rolling and pitch actuators 16.

The rolling and pitch actuators 16 operate upon receiving the signals from the angular velocity sensor. That is, when an electric current is applied to a coil 18, the coil 18 generates a magnetic field which drives the bobbin 22 in the rolling and/or pitch directions. In this way, the magnetic interaction between the coil 18 and a magnet 19 compensate for the hand tremor.

At this time, light emitting diode 23 and light receiving diode 24 recognize a number of rotation times and an angle of the bobbin 22, thereby controlling an angle of the mirror section 21 in the rolling and pitch directions.

In addition, the attractive force between the first and second magnets 27, 28, respectively, prevents the bobbin 22 from moving away from the boss 25. Accordingly, the bobbin 22 and the boss 25 are spaced apart a predetermined, fixed distance from each other. Moreover, the attractive force maintains the alignment between the center point of the bobbin 22 and the boss 25. Finally, the attractive force prevents the bobbin 22 from rotating in the circumferential direction.

While the present invention has been particularly shown and described with reference to the preferred embodiment thereof, it will be understood by those skilled in the art that various changes in form and details may be effected therein without departing from the spirit and scope of the invention as defined by the appended claims.

What is claimed is:

1. A hand tremor compensating apparatus for a video camera including a case having a window at a front end thereof, a camera section installed in the case, a mirror section installed between the window and the camera section for reflecting an incident beam from an object, and rolling and pitch actuators for driving the mirror section in at least one of the rolling and pitch directions, the hand tremor compensating apparatus comprising:

- a barrel having a boss protruding along an inside of the barrel, said boss having an engagement end;
- a post inserted into the boss, such that an end of the post is proximate the engagement end of the boss;
- a bobbin for supporting the mirror section, the bobbin having a contact portion slidably engaged with the engagement end of the boss, said contact portion provided with a groove therein; and
- a rotation restraining means for restraining the bobbin from rotating in a circumferential direction by using a magnetic force, the rotation restraining means being disposed in the groove of the contact portion and the end of the post proximate the engagement end of the boss.

2. The hand tremor compensating apparatus as claimed in claim 1, wherein the rotation restraining means includes a first magnet fixed in the groove of the contact portion, and a second magnet fixed to the end of the post proximate the engagement end of the boss.

3. The hand tremor compensating apparatus as claimed in claim 2, wherein the first and the second magnets are oriented such that an attractive force is generated therebetween.

4. The hand tremor compensating apparatus as claimed in claim 1, wherein the rotation restraining means includes a magnetic substance metal placed in at least one of the bobbin and the post.

5. A hand tremor compensating apparatus for a video camera including a case having a window at a front end thereof, a camera section installed in the case, a mirror section installed between the window and the camera section for reflecting an incident beam from an object, and rolling and pitch actuators for driving the mirror section in at least one of the rolling and pitch directions, the hand tremor compensating apparatus comprising:

- a barrel having a boss protruding along an inside of the barrel, said boss having an engagement end;
- a post inserted into the boss, such that an end of the post is proximate the engagement end of the boss;
- a bobbin for supporting the mirror section, the bobbin having a contact portion slidably engaged with the engagement end of the boss, said contact portion provided with a groove therein; and
- a rotation restraining mechanism which restrains the bobbin from rotating in a circumferential direction by using a magnetic force, the rotation restraining mechanism being disposed in the groove of the contact portion and the end of the post proximate the engagement end of the boss.

* * * * *